May 24, 1932.  L. H. MESSINGER, JR  1,859,785
RUBBER TIRE TREAD CUTTING MACHINE
Filed March 6, 1930  3 Sheets-Sheet 1
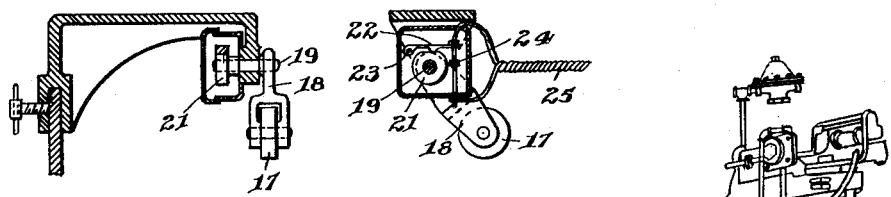
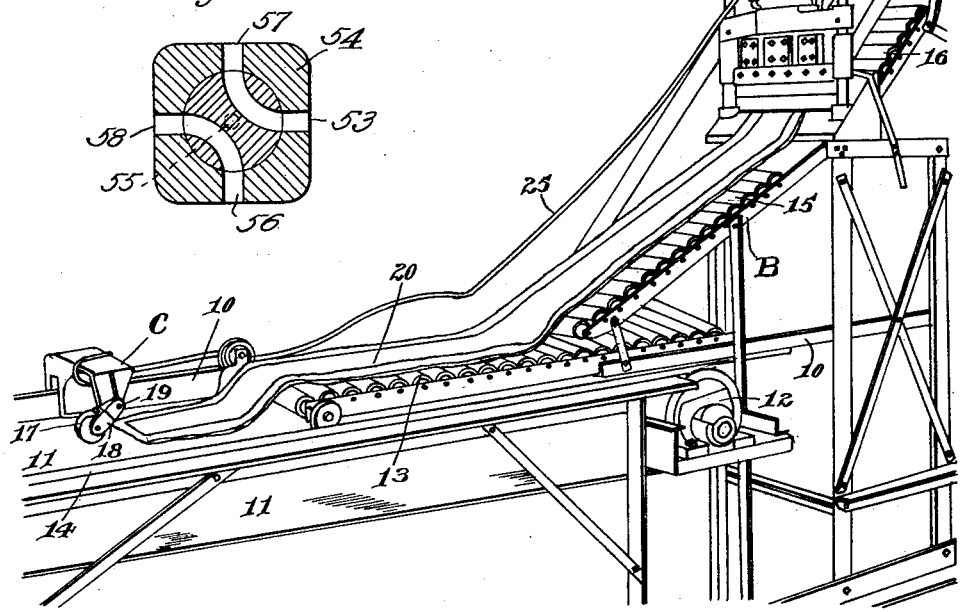
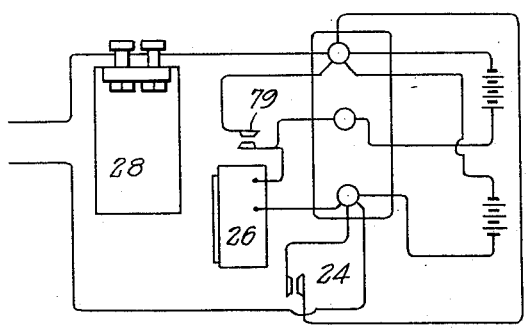
INVENTOR
Lester H. Messinger, Jr.
Chamberlain & Newman
ATTORNEY May 24, 1932.   L. H. MESSINGER, JR   1,859,785
RUBBER TIRE TREAD CUTTING MACHINE
Filed March 6, 1930   3 Sheets-Sheet 2
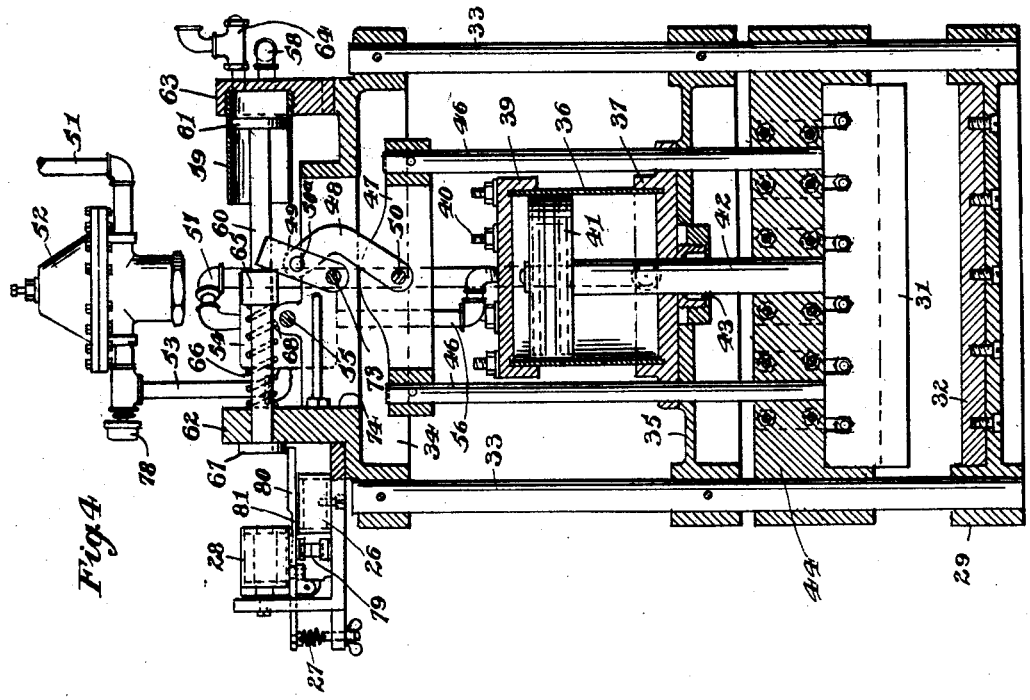
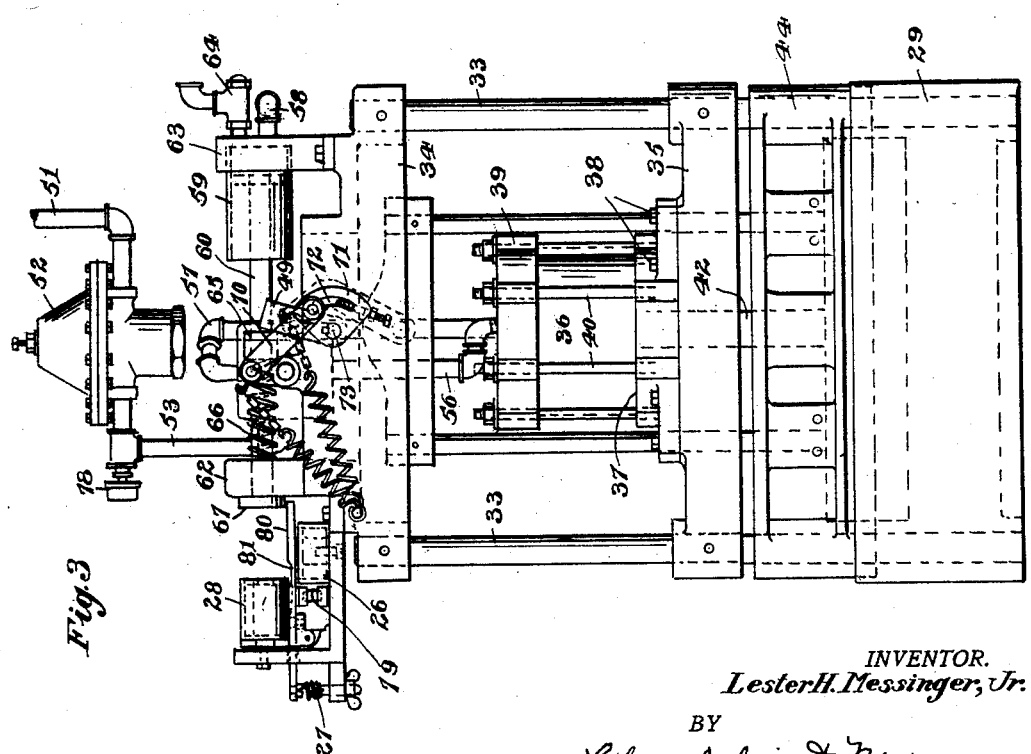
INVENTOR.
Lester H. Messinger, Jr.
BY
Chamberlain & Newman
ATTORNEYS.

May 24, 1932. L. H. MESSINGER, JR 1,859,785
RUBBER TIRE TREAD CUTTING MACHINE
Filed March 6, 1930 3 Sheets-Sheet 3
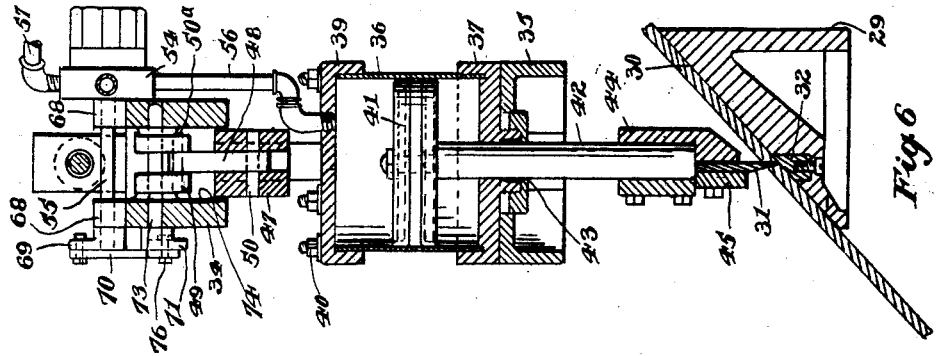
INVENTOR.
Lester H. Messinger, Jr.
BY
Chamberlain & Newman
ATTORNEYS.

Patented May 24, 1932

1,859,785

UNITED STATES PATENT OFFICE

LESTER H. MESSINGER, JR., OF BRIDGEPORT, CONNECTICUT, ASSIGNOR TO THE BLACK ROCK MANUFACTURING COMPANY, OF BRIDGEPORT, CONNECTICUT, A CORPORATION OF CONNECTICUT

RUBBER TIRE TREAD CUTTING MACHINE

Application filed March 6, 1930. Serial No. 433,635.

The present invention refers to improvements in rubber cutting machines, for cutting different sizes of strips of rubber stock into lengths, and refers more especially to a machine that automatically skive-cuts automobile tire tread strips to lengths.

These strips are relatively flat, being about one and one-quarter inches thick through their middle portion and approximately eighteen inches wide, and are of continuous lengths since the strip is fed directly to this machine from the calendering machine, on a conveyor and take-off mechanism of suitable construction. It is therefore necessary to cut this strip into pieces of sufficient length to encircle cord carcasses of given sizes and in a way to provide a heavy tread portion on the finished tire.

The ends of these strips are "skive-cut," that is cut on a bevel, so that when they are laid around a tire the ends will not only meet but the beveled portions overlap in a way to produce a finished tread of uniform thickness. These tread strips are applied to previously formed cord or other forms of carcasses and put into a mould where they are heated and securely applied so as to form an integral unit, the beveled end portions being vulcanized and secured together in a way to cover all traces of the seam.

The invention further relates to that type of rubber cutting machine shown and described in my co-pending application filed October 31, 1928, Ser. No. 316,288 and as before suggested is an improvement on that general type of machine, for skive-cutting operations, as above referred to. This machine, like that above referred to, is operated by compressed air, but includes electric means for releasing the cutting knife at predetermined intervals, for cutting treads to lengths. The machine is simple in construction, accurate, fast of operation, and occupies but a small space.

A further object of the invention is to provide an automatic trip device for actuating the cutter at predetermined times, so as to insure the automatic cutting of tire treads of uniform lengths in relatively quick succession and as the rubber stock is conveyed from a rubber stock forming machine.

The invention, herein illustrated and described, embodies a machine more particularly adapted for use in skive-cutting continuous strips of rubber to produce tire treads of uniform length, and specifically resides in the construction and novel combination and arrangement of parts hereinafter more fully described, illustrated in the accompanying drawings and pointed out in the claims hereto appended, it being understood that the various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings, form a part of this specification, and upon which Fig. 1 shows a perspective view of my improved rubber cutting machine, mounted on a conveyor and take-off, whereby a continuous strip of rubber is skive-cut to lengths, to form tire tread stock;

Fig. 2 shows an enlarged side and sectional view of the electrical contacting device that engages the stock and is actuated thereby to trip and release the cutting knife;

Fig. 3 is a side view of my improved skive-cutting machine, detached from the conveyor and take-off;

Fig. 4 is a central vertical section of the machine, as shown in Fig. 3;

Fig. 5 is an opposite side elevation from that shown in Fig. 3;

Fig. 6 is a cross section through the air-compressor cylinder, toggle mechanism, cutter and cutting block;

Fig. 7 shows a detached side view of the link assembly, shown in Figs. 3 and 6, for operating the four-way valve;

Fig. 8 shows a cross section through a tire tread, as cut on this machine;

Fig. 9 represents a side view of an automobile tire having one of our treads applied.

Fig. 10 shows an enlarged vertical sectional view of the commercial type of four-way valve used in our machine, and shown in Figs. 5 and 6; and Fig. 11 shows a schematic illustration of the electric circuits employed for the electrical operation of the machine.

Referring to the numerals of reference marked upon the drawings, A represents my skive, rubber cutting machine and B the conveyor and take-off, upon which the cutting machine is mounted. Of the conveyor, 10 represents a suitable frame, 11 a horizontally disposed conveyor belt, and 12 a driven roll over which the conveyor belt travels.

A bank of rolls 13 are adjustably mounted on a track 14 that also serves to guide the conveyor belt 11. A second bank of rolls 15 is positioned above the first mentioned bank, and serves to convey the rubber stock from the cutting-off machine A positioned adjacent the upper end of the inclined bank of rolls 15, to the horizontal bank of rolls 13 which, in turn, convey the stock to the conveyor belt 11. A third bank of rolls 16 which are also inclinedly mounted on the rear or intake side of the machine, are positioned to convey and guide the stock through the cutting machine. The stock may be brought to this bank of rolls from a calendering machine by any suitable conveyor system, not herein shown, but which, in our installation, includes a bath through which the stock is conveyed for cooling and hardening.

Figs. 1 and 2 also illustrate a contacting device C which is secured to the frame 10 of the conveyor and includes a roll 17 mounted in an arm 18 secured to a rocker shaft 19 that is operatably supported in the bracket C and serves to allow the roll to run along on the surface of the rubber stock 20 as the same, together with the belt conveyor, moves beneath it. Upon the inner end of this rocker shaft is a cam 21 upon which rides a contact arm 22 that is hingedly supported at 23 and opens and closes the contact points 24 for the purpose of making and breaking a circuit within a cable 25, the other end of this cable being connected to magnets 26 and 28 positioned on top of the cutting machine. The purpose of this device, therefore, is to allow the roll to normally ride on the stock and hold the contact 24 closed, and to allow the roll to drop down into the gaps between the severed ends of the treads 20 and the oncoming stock.

When roll 17 drops down in this gap its shaft turns and shifts the position of the cam 21 in a way to close the circuit at points 24, causing the current to be shunted through magnet coils 26 and 28. This causes a drop in current through magnet coil 26, and allowing spring 27 to break circuit at points 79. This leaves a circuit so that when the switch in the trip is again opened, caused by the roll riding up on the end of the stock, the circuit in the magnet coil 28 will be broken. Further reference to this electrically actuating mechanism will again be made.

The skive-cutting machine A includes a base 29 which is relatively heavy, being formed of metal, and is adapted to be secured to the frame-work of the conveyor and take-off mechanism, as shown in Fig. 1, though it will be obvious that its use is not necessarily confined to this form of mechanism. The top side 30 of this base is inclined preferably at an angle of approximately 45°, and serves as a guide or runway for the rubber stock which moves down the inclined face of the base, beneath the knife 31 which serves to sever the stock in suitable lengths. A block of wood or other suitable material 32 is adjustably positioned in a recess of the base immediately beneath the knife, the face of the block being also beveled to finish with the inclined top surface of the base, and serves as a relatively soft surface against which the knife edge may function in its cutting operations.

A pair of round posts 33—33 are secured in the end portions of the base 30 and extend upward vertically in spaced and parallel relation. A block 34 is supported on the upper ends of these posts in a way to fix the positions thereof, with respect to each other and also to serve as a supporting means for the operating mechanism of the cutter, as will again be referred to. A support 35 is also secured to these two guide posts at a position intermediate of the base and block just referred to, and serves to further stiffen and strengthen the frame structure, and more particularly to support a cylinder 36, the lower end of which is fitted in a plate 37 that is secured to the top side of the support 35 by means of screws 38, as shown in Figs. 2 and 4 of the drawings. The upper end of this cylinder is enclosed by a head 39 that is secured in place by screw bolts 40 that extend down into the plate 37 before mentioned. A reciprocatory piston 41 is mounted within the cylinder and is provided with a depending piston rod 42 that extends down through a suitable packed central hole 43 in the lower head 37 of the cylinder and the support 35, and carries upon its outer lower end a cross head 44 whose end portions are bored to receive and reciprocate upon the posts 33—33 with the action of the piston. This cross head serves to carry the knife blade 31 which is secured thereto by means of screws and a clamping plate 45. A pair of parallel and vertically disposed guide rods 46 are carried by the cross head 44 and are mounted to reciprocate in the support 35, and their upper ends are connected by a yoke 47. One end of a toggle link 48 is pivotally connected to a pin 50 in said yoke, while the other end of the link is similarly connected as at 50ª to a trigger 49 mounted upon a shaft 73 journaled in the before mentioned block 34 and serves, as will later be disclosed, in the automatic functioning of the machine.

The machine is designed to be operated by compressed air taken from any suitable source, as for instance, through a supply pipe 51 and a regulating valve 52. A pipe 53 connects the regulating valve with a four-way valve 54 whose central rotary valve stem 55 is connected to be automatically operated. 56 represents a pipe connection from the four-way valve to the head end of the cylinder 36 which connection, when air pressure is supplied, obviously serves to insure the downward or cutting stroke for the knife. 57 represents a pipe connection from the top side of the four-way valve to the lower end of the cylinder 36, whereby the air pressure, when cut off from the upper end, is lead into the lower end in a way to insure a quick return movement of the piston and knife. 58 represents a pipe connection from the four-way valve to a small cylinder 59 whose piston is operated by the exhaust pressure from both the top and bottom of the main cylinder 36. One end of a piston rod 60 is secured in the piston 61 of this cylinder 59 and the other end is slidably mounted in an upright 62 of the block 34 before mentioned. This cylinder 59 is supported in a bracket 63, secured on the block 34, that also serves as a head for one end of the cylinder. An exhaust pipe and throttle valve 64 are provided for this cylinder. The piston rod 60 for the piston 61 of this cylinder is provided with a collar 65, and a spring 66 is mounted on this rod intermediate the upright 62 and collar 65, and normally tends to hold the piston in its inner position and the armature 67 of the rod against the bracket 63, as shown in Fig. 3, at which time the trigger 49 through its toggle link connection 48 with the yoke 47 is positioned against the collar as indicated in Figs. 3 and 4.

The four-way valve stem 55 extends rearward, and is rotatably mounted in bearings 68—68 of the block 34 and has an arm 69 mounted upon its rear end. This arm is connected by a link 70 with a sector 71 having a slot 72, and mounted on a rocker shaft 73 journaled in the block 34, and carrying the trigger 49 in the opening 74 through the block 34. This rocker shaft, together with the arm, link 70, and valve, is operated through the link 70 carried by the yoke 47. It will thus be seen that with each upward movement of the piston 41 and the yoke 47, the valve 54 is operated.

The parts in the position shown in Fig. 3, with the knife raised, the rubber stock is free to run through beneath the knife. This movement of stock continues and as the required amount of material passes beneath the knife, the knife automatically operates to cut the strip into lengths. These cutting operations, including the return movements of the knife, are accomplished by the use of compressed air, the knife being engaged and set between each successive operation by combined mechanical and electrical means, so as to allow the air pressure to be built up and the knife held in readiness to be released and operated by the air pressure. This release operation is affected by the forward end of the strip, as shown in Fig. 1, engaging the electric contactor, causing the circuit in magnet coil 28 to be broken, and the magnet coil 28 to be demagnetized and the armature released, thus allowing the compression spring to operate to throw the piston rod and piston inward from the position shown in Fig. 5 to that shown in Fig. 4. This causes the collar 65 upon the piston rod 60 to strike the trigger 49, and thereby break the toggle lock and free the piston for action, as before described.

The roll 17 normally rides on the moving strip of rubber stock, but when it reaches the gap between the ends of the treads it drops, closing the circuit through points 24 which shunts coil 26 and breaks points 79, when the roll 17 is again raised by the oncoming treads the circuit is broken in magnet 28 by points 24 releasing the armature 67 which has been severing to hold the rod 60 in a set or cocked position against the action of the spring 66. When this plunger 67 moves over rise 80 in arm 81 the circuit is again closed, energizing magnet coils 26 and 28. As the armature is released, as above suggested, it allows spring 66 to drive the piston rod including its collar 65 against the trigger 49, knocking it and its toggle link off center and causing the air pressure, which has been built up above the main piston 41, to drive the piston and its connected cross head and knife down through the stock to cut off a tread. This downward movement of piston 41 carries toggle link 48, causing the trigger 49 to swing, together with its shaft 73 and sector 71. This sector pulls link 70, causing arm 69 and valve stem 55 to rotate. This movement reverses four-way valve 54 and allows air to exhaust from cylinder 36 above piston 41 and admits air pressure to said cylinder below said piston, thereby driving the knife back to its upper position. When sector 71 is at its lowermost position, spring 75 pulls pin 76 of link 70 along the slot 72 in the sector 71. This retards the action of valve stem 55 and allows sufficient air pressure to be built up, below piston 41, to complete the upward stroke. The upward movement of piston 41 starts four-way valve 54; spring 77 completes the valve movement. The exhaust air from both the down and up stroke of the piston 41 is fed into cylinder 59 and serves to move the armature 67 into contact with magnet coil 28 by which it is held for the resetting of the parts.

Different thicknesses of stock may be cut by maintaining different pressures, by adjusting regulating valve 52, said pressures being determined by means of a gauge 78 connected with the regulating valve.

Having thus described my invention, what I claim and desire to secure by Letters Patent is:

1. In a rubber tread cutting machine, the combination of a bed, posts mounted therein, a block mounted upon the upper ends of the posts, a support secured to the posts, a cylinder mounted on the support, a reciprocatory cross head mounted upon the posts and carrying a knife, a piston within the cylinder bearing a piston rod to support and operate the cross head, rods carried by the cross head and guided in the support, a yoke connecting the upper ends of said rods, a toggle, one member of which is pivotally connected to the yoke and the other to the block, for supporting the piston and knife in a raised position against air pressure in the cylinder, a trip mechanism for said toggle including a reciprocatory rod having means to engage and break the toggle, a spring to operate the rod in the toggle breaking direction, a cylinder and piston for operating the rod against the action of the spring, an armature fixed on the rod and a magnet for holding the armature and rod against the tension of said spring and means to cause the magnet to be deenergized.

2. In a rubber tread cutting machine, the combination of a bed, guide, a reciprocatory slide and knife mounted upon the guides to operate with respect to the bed, a compressed-air cylinder, a piston and piston rod mounted in the cylinder and connected with and supporting the knife slide, a toggle connection for supporting the piston and knife in a raised position against air pressure in the cylinder, a reciprocatory toggle releasing rod, a spring for forcing the rod in the toggle releasing direction mounted upon the rod, compressed-air means for automatically setting the rod in a tripable position against the action of the spring and means to trip the rod.

3. In a rubber tread cutting machine, the combination of a bed, guides mounted thereon, a reciprocatory slide and knife mounted upon the guides to operate with respect to the bed, a compressed-air cylinder, a piston and piston rod mounted in the cylinder and connected with and supporting the knife slide, a toggle connection for supporting the piston and knife in a raised position against air pressure in the cylinder, a reciprocatory toggle releasing rod, a spring for forcing the rod in the toggle releasing direction mounted upon the rod, compressed-air means for automatically setting the rod and toggle in a tripable position against the action of the spring, an electro-magnet for retaining the rod in said tripable position and means for releasing the rod.

4. In a rubber tread cutting machine, the combination of a bed, guides mounted thereon, a reciprocatory slide and knife mounted upon the guides to operate with respect to the bed, a compressed-air cylinder, a piston and piston rod mounted in the cylinder and connected with and supporting the knife slide, a toggle connection for supporting the piston and knife in a raised position against air pressure in one end of the cylinder, a reciprocatory toggle releasing rod, a spring for forcing the rod in the toggle releasing direction mounted upon the rod, compressed-air means for automatically setting the rod in a tripable position against the action of the spring means to trip the rod whereby the piston and toggle are operated, and valve means connected to be operated by the toggle whereby air pressure is applied to the other end of the knife cylinder to return the knife and toggle to the raised position.

5. In a rubber tread cutting machine, the combination of a bed, guides mounted thereon, a reciprocatory slide and knife mounted upon the guides to operate with respect to the bed, a compressed-air cylinder, a piston and piston rod mounted in the cylinder and connected with and supporting the knife slide, a toggle connection for supporting the piston and knife in a raised position against air pressure in one end of the cylinder, a reciprocatory toggle releasing rod, a spring for forcing the rod in the toggle releasing direction mounted upon the rod, compressed-air means for automatically setting the rod in a tripable position against the action of the spring means to trip the rod whereby the piston and toggle are operated, valve means connected to be operated by the toggle whereby air pressure is applied to the other end of the knife cylinder to insure the returning of the knife and toggle to the raised position, and connections with said four-way valve and second mentioned compressed air means whereby its piston and rod are operated to the set position.

6. In a rubber tread cutting machine, the combination of a bed, guides mounted thereon, a reciprocatory slide and knife mounted upon the guides to operate with respect to the bed, a compressed-air cylinder, a piston and piston rod mounted in the cylinder and connected with and supporting the knife slide, a toggle connection for supporting the piston and knife in a raised position against air pressure in the cylinder, a reciprocatory toggle releasing rod, a spring for forcing the rod in the toggle releasing direction mounted upon the rod, compressed-air means for automatically setting the rod in a tripable position against the action of the spring, an electro-magnet for retaining the rod in said tripable position, and an automatic electric switch device in the path of the travel of stock from the cutting machine whereby the magnet is automatically energized and de-energized to hold and release the trip rod.

7. In a rubber cutting machine of the class described, the combination of a compressed air cylinder, a piston mounted in the cylinder, a knife connected with said piston, a toggle for supporting the knife and piston in a raised position against air pressure in the cylinder, a toggle releasing means, comprising a compressed-air cylinder, a piston mounted in the cylinder bearing a reciprocatory rod, a spring upon the rod adapted to operate the same against the action of the cylinder to release the toggle, means for holding the rod in a set position against the action of the spring, and an electric switch device remotely located and in the path of movement of stock from the machine, for causing the release of said holding means.

8. In a rubber cutting machine of the class described, the combination of a reciprocatory slide and knife, a compressed-air cylinder, a piston mounted in the cylinder, a knife carried by the piston, a compressed-air supply, a toggle connection for supporting the knife and piston in raised position against air pressure in one end of the cylinder, spring actuated means for engaging and tripping the toggle, compressed-air means for setting the toggle tripping means, an electromagnet for holding said tripping means in its set position, an automatic switch device for causing the electro-magnet to be deenergized to release the trip, a four-way valve connected with and operated by the toggle to shift the supply of air from one end of the cylinder to the other.

9. In a rubber tread cutting machine, the combination of a compressed-air cylinder, a piston and piston rod mounted in the cylinder, a reciprocatory slide and knife connected to be operated by the piston of the cylinder, a compressed-air supply for operating the piston in both a forward and backward direction, a valve to control the supply of air to opposite ends of the cylinder, a toggle connection for supporting the knife and piston in a raised position, operative connections intermediate the toggle and valve for operating the latter, means for locking the toggle to hold the knife in a raised position, and means for releasing said holding means and toggle.

10. In a rubber cutting machine, the combination of a frame, an air-compressed cylinder, a reciprocatory member, a knife carried thereby a toggle intermediate said frame and member for holding and locking the latter in a set position against air pressure in one end of the cylinder a rocker shaft journaled in the frame, a valve for controlling the air supply to the cylinder including a valve stem, and a link connecting the valve stem and rocker shaft whereby the former is rotated through the action of the toggle to operate the valve.

11. In a rubber cutting machine, the combination with a frame and a compressed-air cylinder, a reciprocatory member, a knife carried thereby a toggle intermediate said frame and member for holding and locking the latter in a set position, against air pressure in one end of the cylinder a rocker shaft journaled in the frame, a valve for controlling the air supply to the cylinders, including a valve stem, a link connecting the valve stem and rocker shaft whereby the former is rotated through the action of the toggle to operate the valve through the operation of the toggle, a reciprocatory rod for striking and breaking the toggle, compressed-air means for setting the rod in an operatable position, and means for operating the rod, when released to break the toggle.

12. In a rubber cutting machine, the combination with a frame and a compressed-air cylinder, a reciprocatory member, a knife carried thereby a toggle intermediate said frame and member for holding and locking the latter in a set position, against air pressure in one end of the cylinder a rocker shaft journaled in the frame, a valve for controlling the air supply to the cylinder including a valve stem, a link connecting the valve stem and rocker shaft whereby the former is rotated through the action of the toggle to operate the valve, a reciprocatory rod, a compressed-air cylinder for positioning the rod in a set position, means for holding the rod in set position, a spring for operating the rod to break the toggle when released, and air connections from the compressed-air cylinder to the valve for operating the former through the latter.

Signed at Bridgeport in the county of Fairfield and State of Connecticut this 5th day of March, A. D. 1930.

LESTER H. MESSINGER, Jr.